United States Patent
Wang

(10) Patent No.: US 11,493,609 B2
(45) Date of Patent: Nov. 8, 2022

(54) MEMS DEVICE WITH INTEGRATED MIRROR POSITION SENSOR

(71) Applicant: Beijing Voyager Technology Co., Ltd., Beijing (CN)

(72) Inventor: Youmin Wang, Mountain View, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 0 days.

(21) Appl. No.: 16/728,874

(22) Filed: Dec. 27, 2019

(65) Prior Publication Data

US 2020/0278428 A1    Sep. 3, 2020

Related U.S. Application Data

(63) Continuation-in-part of application No. 16/290,670, filed on Mar. 1, 2019, now Pat. No. 11,262,575.

(51) Int. Cl.
| | | |
|---|---|---|
| *G02B 26/08* | (2006.01) | |
| *G01S 7/481* | (2006.01) | |
| *G02B 26/10* | (2006.01) | |

(52) U.S. Cl.
CPC ........ *G01S 7/4817* (2013.01); *G02B 26/0833* (2013.01); *G02B 26/101* (2013.01)

(58) Field of Classification Search
None
See application file for complete search history.

(56) References Cited

U.S. PATENT DOCUMENTS

| | | | |
|---|---|---|---|
| 6,467,345 B1 | 10/2002 | Neukermans et al. | |
| 7,362,484 B2 | 4/2008 | Mun et al. | |
| 7,894,114 B2 | 2/2011 | Urakawa et al. | |
| 10,422,881 B1 | 9/2019 | Wang et al. | |
| 2002/0146200 A1 | 10/2002 | Kudrle et al. | |
| 2007/0146851 A1* | 6/2007 | Nakajima | G02B 26/105 |
| | | | 359/199.1 |

(Continued)

FOREIGN PATENT DOCUMENTS

| | | |
|---|---|---|
| CN | 102298207 A | 12/2011 |
| CN | 102944879 A | 2/2013 |

(Continued)

OTHER PUBLICATIONS

U.S. Appl. No. 16/290,670, "Non-Final Office Action", dated Jan. 21, 2021, 12 pages.

(Continued)

*Primary Examiner* — Jennifer D. Carruth
(74) *Attorney, Agent, or Firm* — Kilpatrick Townsend & Stockton LLP

(57) ABSTRACT

Methods and systems for using a dual sided MEMS mirror for determining a direction of a LiDAR beam are disclosed. In one example a MEMS package includes a dual sided MEMS mirror that is manipulable about two orthogonal axes. A first surface of the MEMS mirror is used to steer a LiDAR beam that is used to perform LiDAR imaging of an area of interest. As the mirror is moved, a second surface of the mirror reflects a sensing beam onto a position sensitive device. Data from the position sensitive device is used to determine a position of the mirror which can be used to determine a direction of the steered LiDAR beam.

8 Claims, 7 Drawing Sheets

(56) References Cited

U.S. PATENT DOCUMENTS

| | | |
|---|---|---|
| 2010/0046054 A1 | 2/2010 | Jeong et al. |
| 2010/0172612 A1 | 7/2010 | Moidu |
| 2017/0102538 A1* | 4/2017 | Gamet ................ G02B 26/085 |
| 2017/0184707 A1 | 6/2017 | Sugiura et al. |
| 2018/0246315 A1 | 8/2018 | Miner et al. |
| 2019/0041501 A1 | 2/2019 | Noguchi |
| 2019/0193923 A1 | 6/2019 | Patel |
| 2019/0293923 A1* | 9/2019 | Ghahremani ......... G01S 7/4817 |
| 2020/0225084 A1* | 7/2020 | de Wit ................. G01J 5/0225 |
| 2020/0278428 A1 | 9/2020 | Wang |
| 2020/0278532 A1* | 9/2020 | Lee ....................... G01S 7/4817 |
| 2020/0333547 A1* | 10/2020 | Mollard ............... G02B 5/0226 |

FOREIGN PATENT DOCUMENTS

| | | |
|---|---|---|
| CN | 104423036 A | 3/2015 |
| CN | 207336754 U | 5/2018 |
| CN | 108427123 A | 8/2018 |
| DE | 102016221245 A1 | 5/2018 |
| EP | 3109685 A1 | 12/2016 |
| WO | 2018175757 A1 | 9/2018 |
| WO | 2019037809 A1 | 2/2019 |

OTHER PUBLICATIONS

PCT/IB2020/051736, "International Search Report and Written Opinion", dated Jun. 4, 2020, 9 pages.
PCT/IB2020/051739, "International Search Report and Written Opinion", dated May 27, 2020, 9 pages.
Final Office Action for U.S. Appl. No. 16/290,670, dated Jul. 28, 2021, 14 pages.
Notice of Allowance for U.S. Appl. No. 16/290,670, dated Oct. 20, 2021, 9 pages.
International Preliminary Report on Patentability for PCT/IB2020/051736, dated Sep. 16, 2021, 5 pages.
International Preliminary Report on Patentability for PCT/IB2020/051739, dated Sep. 16, 2021, 5 pages.

* cited by examiner

MEMS DEVICE WITH INTEGRATED MIRROR POSITION SENSOR

CROSS-REFERENCES TO OTHER APPLICATIONS

This application is a Continuation-In-Part of and claims the benefit of priority to U.S. non-provisional patent application Ser. No. 16/290,670, for "MEMS PACKAGE WITH DOUBLE-SIDED MIRROR" filed on Mar. 1, 2019 which is hereby incorporated by reference in entirety for all purposes.

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and a light detection system to estimate distances to environmental features (e.g., vehicles, structures, etc.). In some systems, the light source can be steered in a repetitive scanning pattern across a region of interest to form a collection of points that are dynamically and continuously updated in real-time, forming a "point cloud." The point cloud data can be used to estimate, for example, a distance, dimension, and location of an object relative to the LiDAR system, often with very high fidelity (e.g., within 5 cm).

In some applications the light source is steered by reflecting the light source off of a manipulable mirror that is formed as a part of a micro-electromechanical system (MEMS) device. Thus, by controlling an orientation of the mirror a single light source can be steered in a scanning pattern to generate the "point cloud". To increase the speed and accuracy of LiDAR systems new LiDAR systems will require improvements in determining and controlling the mirror's position.

BRIEF SUMMARY

In some embodiments a micro-electromechanical system (MEMS) package comprises a manipulable mirror having a first reflective surface positioned opposite and spaced apart from a second reflective surface. A transparent window is positioned adjacent to and aligned with the first reflective surface. A laser source is positioned to direct a sensing beam onto the second reflective surface, and a position sensitive device is arranged to receive a reflected sensing beam reflected from the second reflective surface.

In some embodiments the manipulable mirror is a portion of a MEMS device that is configured to steer the mirror about two orthogonal axes. In various embodiments the MEMS package further comprises a substrate configured to mechanically and electrically couple to the MEMS device, and a package base attached to a bottom surface of the substrate, wherein the transparent window is attached to a top surface of the substrate.

In some embodiments the transparent window is hermetically sealed to the substrate and the package base is hermetically sealed to the substrate. In various embodiments the laser source and the position sensitive device are attached to the package base. In some embodiments the package base is electrically coupled to the laser source and to the position sensitive device.

In some embodiments the MEMS package further comprises a package base that is coupled to a bottom surface of the MEMS device, and the transparent window is coupled to a top surface of the MEMS device. In various embodiments the package base comprises silicon and the position sensitive device is integrally formed within the package base. In some embodiments the package base comprises silicon and the laser source is integrally formed within the package base.

In some embodiments the MEMS package further comprises a power control circuit configured to receive an input signal from the position sensitive device, wherein the input signal is related to a power output level of the laser source, and transmit an output signal to the laser source, wherein the output signal controls the power output level of the laser source.

In some embodiments an electro-mechanical component comprises a MEMS device including a manipulable mirror having a first reflective surface positioned opposite and spaced apart from a second reflective surface. A transparent window is positioned adjacent a top surface of the MEMS device. A package base is positioned adjacent a bottom surface of the MEMS device. A laser source coupled to the package base, and a position sensitive device is coupled to the package base.

In some embodiments the laser source is positioned to direct a sensing beam onto the second reflective surface. In various embodiments the position sensitive device is positioned to receive a reflected sensing beam reflected from the second reflective surface. In some embodiments the component further comprises a substrate that receives the MEMS device and is sealed to both the transparent window and to the package base.

In some embodiments the component further comprises a package base that is attached to the MEMS device with a first seal and wherein the transparent window is attached to the MEMS device with a second seal. In various embodiments the package base comprises a semiconductor material and the position sensitive device is integrated within the package base.

In some embodiments a method of using an electromechanical component comprises receiving a first light beam through a window of the component and steering a reflection of the first light beam through the window by reflecting the first light beam off a first surface of a mirror positioned within the component. A second light beam is generated using a laser source positioned within the component, and a reflection of the second light beam is steered using a second surface of the mirror, wherein the second surface of the mirror is opposite and adjacent the first surface of the mirror. The reflection of the second light beam is received with a position sensitive device positioned within the component.

In some embodiments a power of the second light beam is regulated using a power control circuit that receives an input signal from the position sensitive device. In various embodiments the first light beam is generated by a LiDAR beam generator. In some embodiments the position sensitive device is integrated into a silicon-based package base that forms a portion of the component.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The detailed description is set forth with reference to the accompanying figures.

DETAILED DESCRIPTION

Aspects of the present disclosure relate generally to object and environment detection systems, and more particularly to LiDAR systems, according to certain embodiments.

In the following description, various examples of microelectromechanical systems (MEMS) devices that can be used for LiDAR-based systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
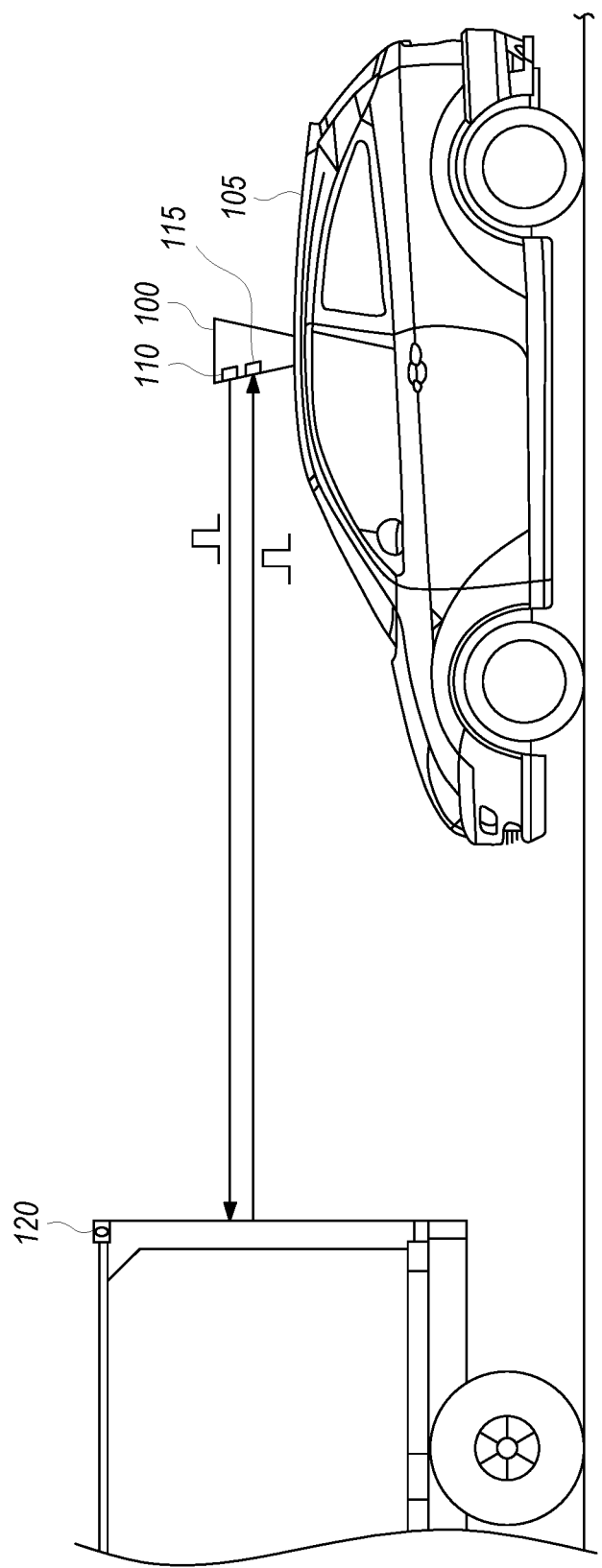
FIG. 1 illustrates an autonomous driving vehicle, according to certain embodiments of the invention.

The following high level summary is intended to provide a basic understanding of some of the novel innovations depicted in the figures and presented in the corresponding descriptions provided below. Aspects of the invention relate to an LiDAR-based system. As an illustrative example, FIG. 1 depicts an LiDAR-based system 100 mounted on a vehicle 105 (e.g., automobile, unmanned aerial vehicle, etc.). LiDAR system 100 may use a pulsed light LiDAR source 110 (e.g., focused light, lasers, etc.) and detection system 115 to detect external objects and environmental features (e.g., vehicle 120, structures, etc.), determine a vehicle's position, speed, and direction relative to the detected external objects, and in some cases may be used to determine a probability of collision, avoidance strategies, or otherwise facilitate certain remedial actions.

LiDAR source 110 may employ a light steering system, described in more detail below, that includes a mirror configured to steer a pulsed light source, also called a LiDAR beam. In some embodiments the mirror is manipulable and sequentially steers the LiDAR beam in a scan and repeat pattern across a large area to detect obstacles around the vehicle and to determine distances between the obstacles and the vehicle. The mirror can be part of a MEMS device that enables the mirror to be rotated about one or more axes (e.g., tilted).

As the mirror is rotated to steer the LiDAR beam, knowledge of the mirror's position can be used to determine the direction of the reflected LiDAR beam. In some embodiments the mirror may be dual sided (e.g., include two opposite and opposing reflective surfaces) such that one surface of the mirror steers the LiDAR beam and the other surface reflects a sensing beam onto a detector that senses a position of the mirror. More specifically, to detect the position of the mirror a sensing beam can be directed on to the second side of the mirror which steers the sensing beam on to a position sensitive device in an identical but opposite manner as the LiDAR beam. Data from the position sensitive device can be used to determine an orientation of the mirror and the related direction of the reflected LiDAR beam.

In order to better appreciate the features and aspects of MEMS components having a dual sided mirror and integrated positon sensing features according to the present disclosure, further context for the disclosure is provided in the following section by discussing one particular implementation of an LiDAR component according to some embodiments of the present disclosure. These embodiments are for example only and other embodiments can be employed in other systems such as, but not limited to optical diagnostic equipment, optical manufacturing equipment (e.g., laser direct structuring) or any other system that steers light.

Figure 2:
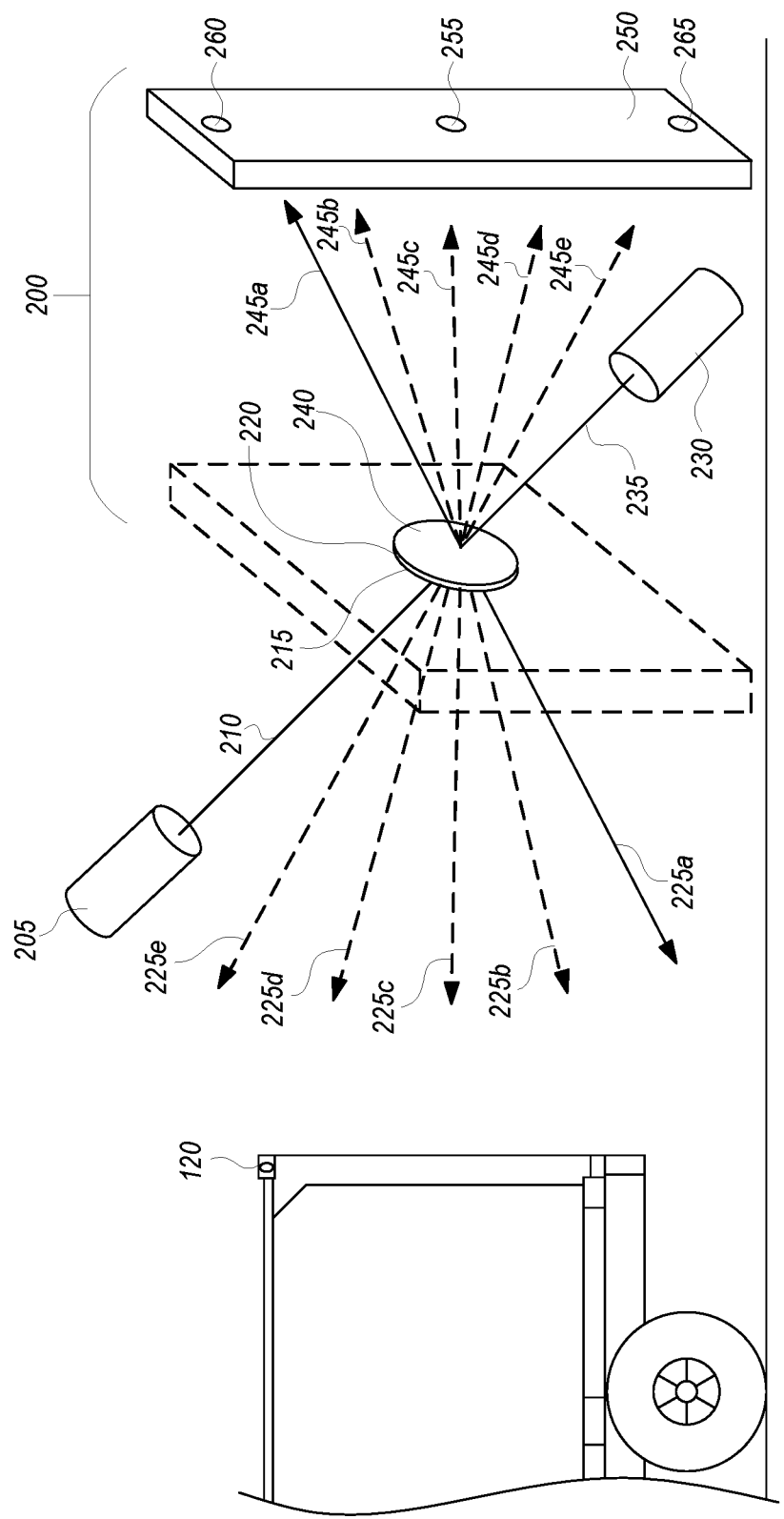
FIG. 2 depicts a simplified illustrative rendering of a MEMS package including a dual sided mirror that can be used in the LiDAR system shown in FIG. 1, according to certain embodiments of the invention.

FIG. 2 depicts a simplified illustrative rendering of a MEMS package 200 that can be used in LiDAR-based system 100 (see FIG. 1). As shown in FIG. 2, MEMS package 200 can be used to form a portion of an LiDAR source, such as source 110 illustrated in FIG. 1. MEMS package 200 can include a dual sided mirror 220, formed as a portion of a MEMS device, a sensing beam generator 230 and a position sensitive device 250, as described in more detail below.

In some embodiments, an LiDAR beam generator 205 directs an emitted LiDAR beam 210 on to a first surface 215 of a dual sided mirror 220. Emitted LiDAR beam 210 is reflected off dual sided mirror 220 such that as the dual sided mirror is moved, the mirror "steers" the reflected LiDAR beam (225a . . . 225e). Thus, by changing the orientation of dual sided mirror 220, reflected LiDAR beam (225a . . . 225e) can be steered in a scanning pattern to detect objects, such as vehicle 120.

Simultaneously, as emitted LiDAR beam 210 is being steered by dual sided mirror 220, a sensing beam generator 230 directs an emitted sensing beam 235 on to a second surface 240 of dual sided mirror 220. As dual sided mirror 220 moves, a reflected sensing beam (245a . . . 245e) is steered in direct relationship with reflected LiDAR beam (225a . . . 225e) and is directed on to position sensitive device 250. Position sensitive device 250 senses a position of reflected sensing beam (245a . . . 245e) on the position sensitive device and transmits corresponding data to a processor, described in more detail below, that uses the data to determine an orientation of dual sided mirror 220 and the related direction of reflected LiDAR beam (225a . . . 225e). More specifically, as dual sided mirror 220 moves, reflected sensing beam (245a . . . 245e) moves in direct relationship with reflected LiDAR beam (225a . . . 225e) such that data from position sensitive device 250 can be used to determine a direction of reflected LiDAR beam. For example, reflected LiDAR beam 225a corresponds to a position of reflected sensing beam 245a on position sensitive device 250, a direction of reflected LiDAR beam 225b corresponds to a position of reflected sensing beam 245b on the position sensitive device, a direction of reflected LiDAR beam 225c corresponds to a position of reflected sensing beam 245c on the position sensitive device, etc.

In some embodiments position sensitive device 250 is a linear sensor that includes a bias supply node 255, a first sense node 260 and a second sense node 265. Position sensitive device can indicate a position of reflected sensing beam (245a . . . 245e) by changing a ratio of electrical resistance between bias supply node 255 and first sense node 260 (e.g., a first resistance value) and between bias supply node 255 and second sense node 265 (e.g., a second resistance value). In one embodiment, position sensitive device 250 includes a plurality of PIN diodes such that when the position sensitive device is exposed to reflected sensing beam (245a . . . 245e), the illuminated PIN diodes change a local resistance within the position sensitive device. The change in local resistance can be detected by evaluating a ratio the first and the second resistances, or the corresponding first and second currents. Thus, the ratio of the first and second resistances and/or currents can be directly related to a location of reflected sensing beam (245a . . . 245e) on position sensitive device 250.

In some embodiments the first and the second resistance values can be determined by evaluating the first current flowing between bias supply node 255 and first sense node 260 that is related to the first resistance, and by evaluating the second current flowing between bias supply node 255 and second sense node 265 that is related to the second resistance. In further embodiments other position sensitive devices can be used that are capable of determining a two-dimensional position of reflected sensing beam (245a . . . 245e), as described in more detail below.

Figure 3:
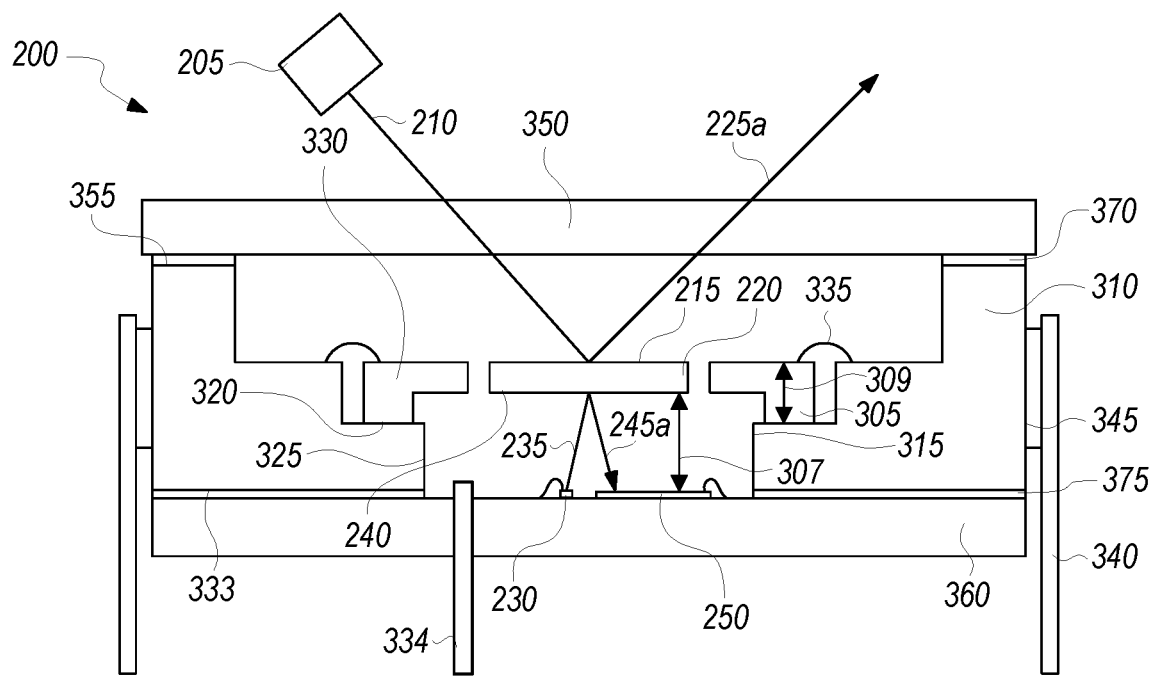
FIG. 3 illustrates a simplified cross-sectional view of the MEMS package shown in FIG. 2, according to certain embodiments of the invention.

FIG. 3 illustrates a simplified cross-sectional view of MEMS package 200 shown in FIG. 2. As shown in FIG. 3, MEMS package 200 includes dual sided mirror 220 that has a first surface 215 opposite and spaced apart from a second surface 240. As described above, first surface 215 reflects emitted LiDAR beam 210, and second surface 240 reflects emitted sensing beam 235. As further shown in FIG. 3, MEMS device 305 includes a sensing beam generator 230 that directs emitted sensing beam 235 off second surface 240 and on to position sensitive device 250 such that a position of dual sided mirror 220 can be determined, as described in more detail herein.

Dual sided mirror 220 is a portion of a MEMS device 305 that enables the dual sided mirror to be moved within MEMS package 200 when electrical signals are applied to the MEMS device. Dual sided mirror 220 is shown in FIG. 3 in a neutral position, however when electrical signals are supplied to MEMS device 305 the dual sided mirror can rotate about one or more axes. In some embodiments dual sided mirror 220 can be rotated about a first axis and a second axis wherein the first axis is orthogonal to the second axis.

In some embodiments MEMS device 305 can be constructed from a base layer of silicon, one or more layers of an oxide, such as for example silicon-oxide and a top layer of silicon. The top layer of silicon can be implanted with one or more materials and can include metallic conductors and other structures, such as for example comb drive structures, formed thereon. Mirrored surfaces at first and second surfaces 215, 240 can be formed by depositing one or more reflective materials on MEMS device 305.

MEMS device 305 is positioned within MEMS package 200 by a substrate 310 that forms both a structural portion of MEMS package 200 as well as an electrical routing structure, as described in more detail herein. In some embodiments, substrate 310 can be formed from a low temperature co-fired ceramic (LTCC) material in which one or more layers of "green" ceramic are cut, drilled, printed on with conductive ink, and co-fired to form a multilayer ceramic substrate having internal and external electrical conductors that may include conductive vias and other features. In other embodiments other materials can be used for substrate, such as, but not limited to other types of ceramic-based materials or organic-based materials.

As shown in the embodiment illustrated in FIG. 3, substrate 310 includes an aperture 315 that is formed through a thickness of the substrate and sized to provide optical communication between sensing beam generator 230, dual sided mirror 220 and position sensitive device 250. Substrate 310 can also include a ledge 320 formed around and within a perimeter 325 of aperture 315. MEMS device 305 includes a peripheral portion 330 that is attached to ledge 320 with an epoxy, a solder or other attachment material. Peripheral portion 330 of MEMS device 305 supports and controls an orientation of dual sided mirror 220, as described in more detail below. MEMS device 305 can be electrically coupled to substrate 310 with one or more wirebonds 335. Substrate 310 is electrically coupled to one or more leads 340 that are attached to an exterior 345 of MEMS package 200 and can be used to electrically and mechanically couple the MEMS package to an exterior circuit board or other device.

MEMS package 200 further includes a package base 360 that is attached to a bottom surface 333 of substrate 310. In some embodiments package base 360 can include electrical routing and in various embodiments can be a ceramic or organic based structure. Package base 360 can be coupled to an external circuit board or other device with one or more feedthrough conductors 334 and/or through electrical connections to substrate 310.

Sensing beam generator 230 can be any type of light emitting device including, but not limited to, a vertical cavity surface emitting laser (VCSEL), an edge emitting laser or an LED. Sensing beam generator 230 can be packaged in an electronic package (e.g., SOIC, QFP, QFN), or it can be a discrete semiconductor device that is directly attached to package base 360 and electrically coupled thereto with wirebonds, flip-chip bumps or other interconnects.

Position sensitive device 250 can be any type of position sensing device including but not limited to an array of photoelectric devices that may include PIN diodes. Position sensitive device 250 can be packaged in an electronic package (e.g., SOIC, QFP, QFN) with a transparent top cover or it can be a discrete semiconductor device that is directly attached to package base 360 and electrically coupled thereto with wirebonds, flip-chip bumps or other interconnects.

MEMS package 200 also includes a transparent window 350 coupled to a top surface 355 of substrate. Transparent window 350 is positioned adjacent to and aligned with first surface 215 of dual sided mirror 220 such that emitted LiDAR beam 210 can pass through the transparent window and be reflected off first reflective surface 215. As dual sided mirror 220 is moved, reflected LiDAR beam 225*a* is steered and passes back through the transparent window. Transparent window 350 can be made from a transparent material such as, but not limited to, fused silica, quartz, sapphire, zinc selenide, calcium fluoride, magnesium fluoride, sodium chloride, potassium bromide or any other suitable material that is transparent to a wavelength of emitted LiDAR beam 210 and/or emitted sensing beam 235. In further embodiments transparent window 350 can include an anti-reflective coating to minimize light that is reflected off a surface of the transparent window.

In some embodiments transparent window 350 and package base 360 are attached to substrate 310 using a material that forms a hermetic seal such that MEMS package 200 is hermetically sealed. In one embodiment transparent window 350 is brazed to substrate 310 using a first braze seal 370, and package base 360 is brazed to the substrate using a second braze seal 375. In one embodiment, first and second braze seals 370, 375, respectively, can be a combination of gold and tin, however in other embodiments they may be a combination of gold and silicon, tin silver and copper or any other combination of materials.

In one embodiment a sensor distance 307 is a distance between position sensitive device 250 and second surface 240 of dual sided mirror 220 is between 1 millimeter and 5 millimeters, while in another embodiments the sensor distance is between 2 millimeters and 4 millimeters and in one embodiment the sensor distance is 3 millimeters. In one embodiment a MEMS device thickness 309 is between 0.5 millimeters and 0.9 millimeters and in another embodiment MEMS device thickness 309 is between 0.6 millimeters and 0.8 millimeters and in one embodiment MEMS device thickness is 0.7 millimeters. MEMS package 200 is not limited to the geometry and/or configuration described herein and one of skill in the art with the benefit of this disclosure would appreciate changes in the geometry and configuration.

Substrate 310 is not limited to the geometry and/or configuration described herein. A person of skill in the art will appreciate that, in other embodiments, any other suitable material can be used for substrate 310 including any ceramic, organic (such as polyamide printed circuit boards), insulated metallic or combination thereof. In some embodiments a metallic frame can be used in place of substrate 310 and one or more electrical feedthroughs can pass through the frame, be electrically insulated from the frame, and used to conduct electrical signals to MEMS device 305. Other package configurations known to those of skill in the art can be substituted.

MEMS package 200 is not limited to using wirebonds 335 to couple MEMS device 305 to substrate 310. A person of skill in the art will appreciate that, in other embodiments, any other suitable interconnect can be used including but not limited to solder balls, solder pads, pins or columns.

As used herein a LiDAR system shall be defined as a surveying and detection apparatus that emits pulsed light from a source and measures reflected pulses with a detection system. The pulsed light source can have any bandwidth or combination of bandwidths of light frequencies and in some embodiments can use ultraviolet, visible and/or near infrared light. As used herein, transparent shall mean a material that allows a substantial portion of the wavelengths emitted by a particular light source to pass through. Similarly, as used herein, the terms mirror and reflective surface shall be synonymous and shall mean a surface that reflects a substantial portion of the wavelengths emitted by a particular light source.

Figure 4:
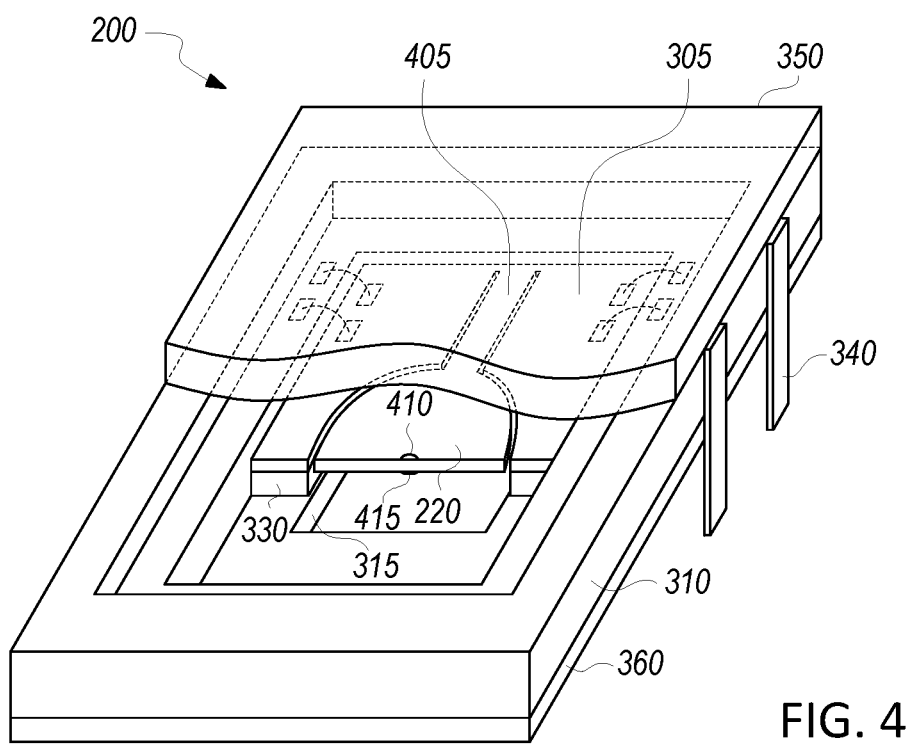
FIG. 4 illustrates a simplified isometric view of the MEMS package shown in FIGS. 2 and 3, according to certain embodiments of the invention.

FIG. 4 illustrates a simplified isometric view of MEMS package 200 shown in FIGS. 2 and 3. As shown in FIG. 4, portions of transparent window 350 and MEMS device 305 have been cut away for clarity. As described above, MEMS device 305 can include peripheral portion 330 that supports dual sided mirror 220 over aperture 315. Dual sided mirror 220 can be coupled to peripheral portion 330 with one or more flexible beams 405. Flexible beams 405 can include a comb drive or other structure (not shown) that enables dual sided mirror 220 to be moved. Dual sided mirror 220 can be positioned over aperture 315 allowing for the dual sided mirror to be tilted along at least two orthogonal axes without making contact with substrate 310.

In some embodiments, to correlate reflected sense beam 245*a* (see FIGS. 2 and 3) with reflected LiDAR beam 225*a*, emitted sense beam 235 may be focused on a similar location on dual sided mirror 220 as emitted LiDAR beam 210. More specifically, emitted LiDAR beam 210 (see FIGS. 2 and 3) may be focused on a center portion 410 of first surface 215 and emitted sensing beam 235 may be focused on a central portion 415 of second surface 240, where the center portion is directly opposite the central portion such that when dual sided mirror 220 is moved, reflected sense beam 245*a* (see FIG. 2) responds substantially similar to reflected LiDAR beam 225*a*.

Figure 5:
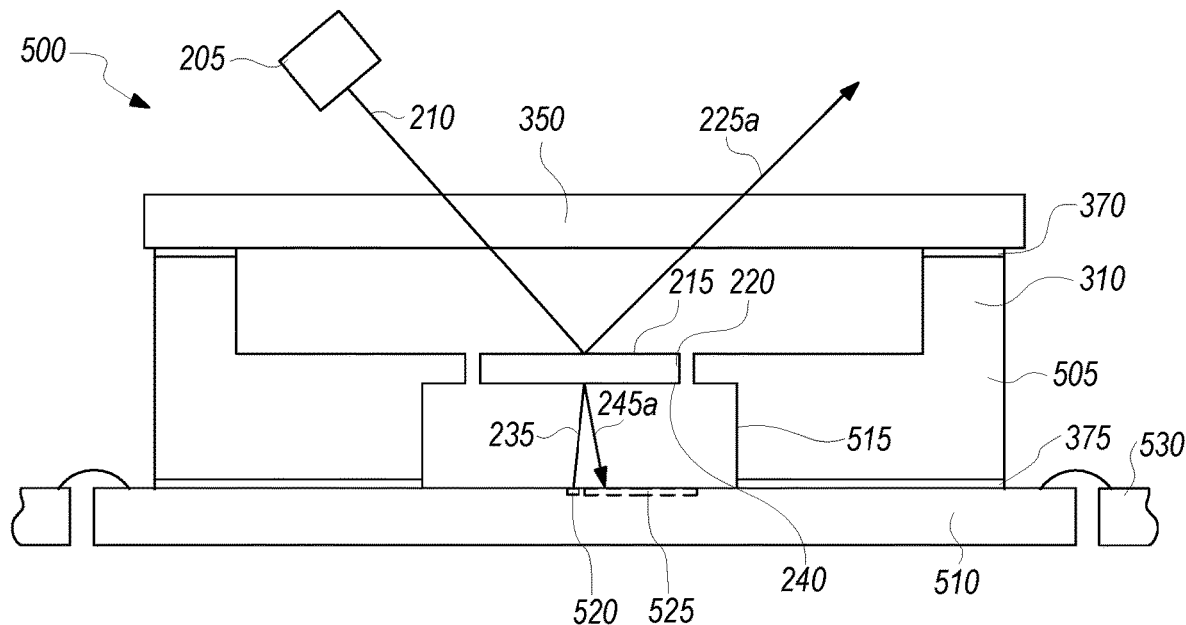
FIG. 5 illustrates a simplified cross-sectional view of a MEMS package that includes a MEMS device that forms an exterior portion of the MEMS package, according to certain embodiments of the invention.

FIG. 5 illustrates a simplified cross-sectional view of a MEMS package 500 that is similar to MEMS package 200 illustrated in FIGS. 2-4, however in the embodiment illustrated in FIG. 5, substrate 310 of FIGS. 2 and 3 has been eliminated and a MEMS device 505 is attached directly to package base 510 and transparent window 350. As shown in FIG. 5, MEMS device 505 includes an aperture 515 that is formed through a thickness of the MEMS device and is sized to provide optical communication between sensing beam generator 520, dual sided mirror 220 and position sensing device 525.

Also shown in FIG. 5 is an embodiment in which package base 510 is a semiconductor material, that may comprise silicon. In one embodiment, sensing beam generator 520 and position sensing device 525 are integrated within package base 510. More specifically, in some embodiments one or both of sensing beam generator 520 and position sensing device can be silicon-based devices that are integrally formed as a portion of silicon-based package base 510. In further embodiments package base 510 can be interconnected to an external structure 530 that may be a leadframe of an electronic package, a circuit board, a substrate or other device. One of ordinary skill, with the benefit of this disclosure, would recognize many variations, modifications, and alternative of ways of interconnecting package base 510 to external structure 530, such as, but not limited to wirebonds, flip-chip bumps, direct die to die bonding or brazed leads.

Figure 6:
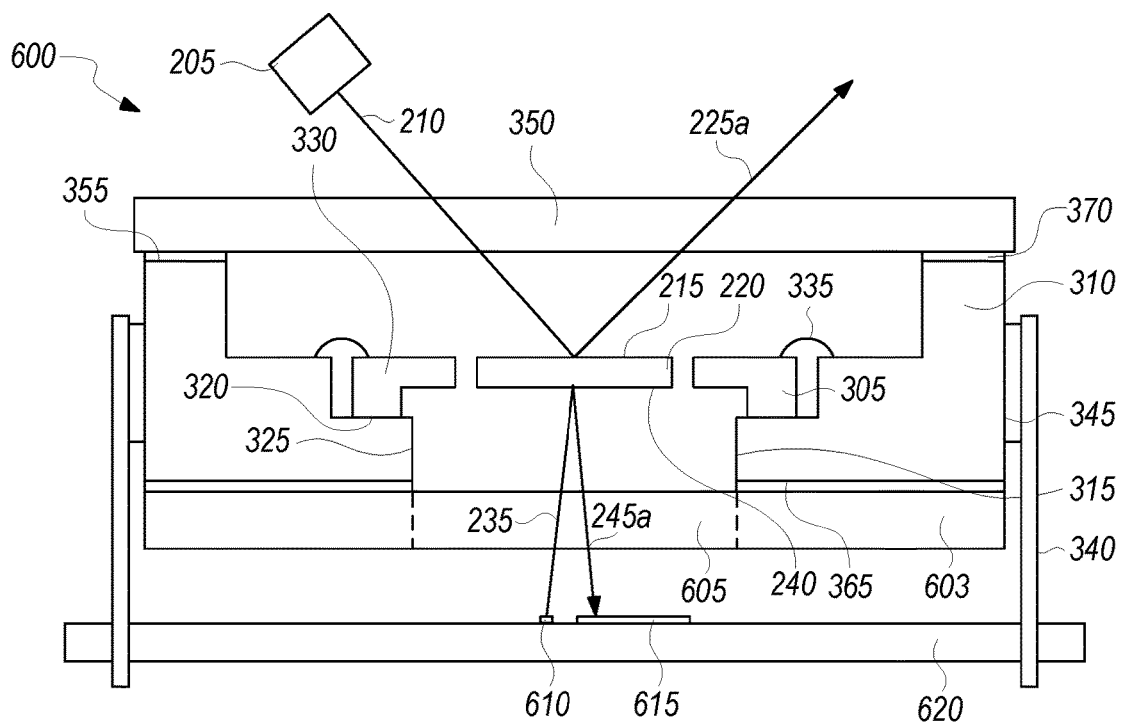
FIG. 6 illustrates a simplified cross-sectional view of a MEMS package that includes an exterior substrate, according to certain embodiments of the invention.

FIG. 6 illustrates a simplified cross-sectional view of a MEMS package 600 that is similar to MEMS package 200 illustrated in FIGS. 2-4, however in the embodiment illustrated in FIG. 6, package base 603 includes a transparent portion 605. In addition, sensing beam generator 610 and position sensitive device 615 are attached to external substrate 620. As shown in FIG. 6, a sealed portion of MEMS package includes transparent window 350, substrate 310, MEMS device 305 and package base 603. Sensing beam generator 610 and position sensitive device 615 are mounted external to MEMS package 600 on external substrate 620. More specifically, in some embodiments MEMS package 600 may be sealed (e.g., hermetically sealed) and external substrate 620 may be external to the sealed portion of the MEMS package.

As described above, package base 603 can include a transparent portion 605 that enables sensing beam generator 610 to transmit emitted sensing beam 235 through the transparent portion and reflected sensing beam 245a to be reflected through the transparent portion to position sensitive device 615. In some embodiments package base 603 may comprise a ceramic material and transparent portion 605 may be a window that is attached to the ceramic material. One of ordinary skill, with the benefit of this disclosure, would recognize many variations, modifications, and alternatives. For example, in another embodiment package base 603 can be completely transparent such that separate transparent portion 605 is not needed. In further embodiments, one or more leads 340 can be electrically coupled to external substrate 620. In some embodiments external substrate 620 can be a multilayer organic circuit board while in other embodiments it may be a ceramic-based material.

Figure 7:
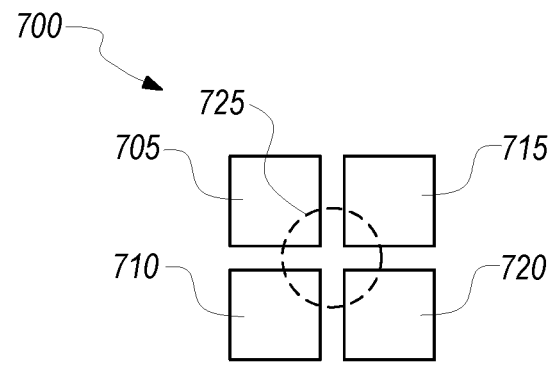
FIG. 7 illustrates a quad position sensitive device, according to certain embodiments of the invention.

FIG. 7 illustrates a quad position sensitive device 700, according to embodiments of the disclosure. As shown in FIG. 7, quad position sensitive device 700 includes four separate position sensitive devices 705, 710, 715 and 720. In one embodiment each separate position sensitive device 705, 710, 715 and 720 can have photosensitive structures, as described in more detail above, such that quad position sensitive device 700 can provide two-dimensional (2-D) information on a location of reflected beam 725. One of ordinary skill, with the benefit of this disclosure, would recognize many variations, modifications, and alternatives of position sensitive devices. For example, any number and arrangement of separate position sensitive devices can be used. In one embodiment a row of multiple sequential position sensitive devices can be used to provide a unidirectional position sensitive device. In another embodiment an array of nine separate position sensitive devices can be used to provide a 2-D position sensitive device.

Figure 8:
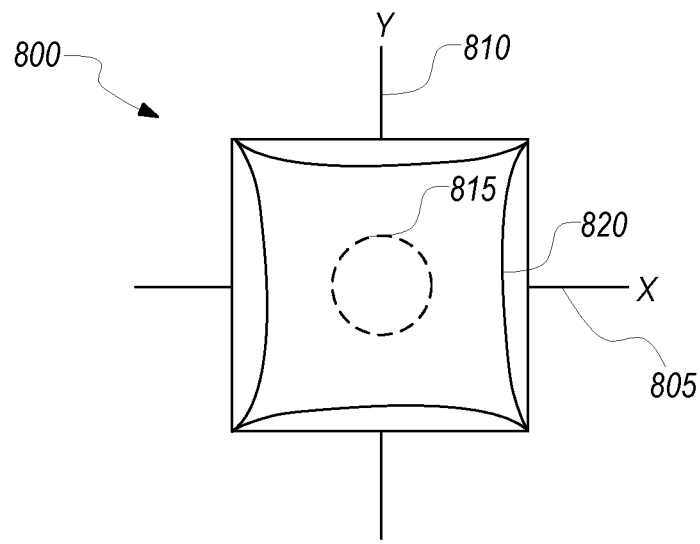
FIG. 8 illustrates a two-dimensional position sensitive device, according to certain embodiments of the invention.

FIG. 8 illustrates a 2-D position sensitive device 800, according to embodiments of the disclosure. As shown in FIG. 8, 2-D position sensitive device 800 includes an X-axis 805 and a Y-axis 810 with photosensitive structures disposed across the device. Thus, 2-D position sensitive device 800 can report a 2-D position of reflected beam 815 within sensing region 820 (e.g., X and Y coordinates).

Figure 9:
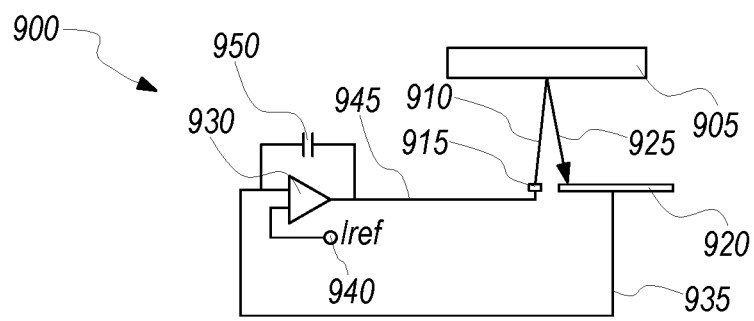
FIG. 9 illustrates a simplified schematic of a power control circuit, according to certain embodiments of the invention.

FIG. 9 illustrates a simplified schematic of a laser power control circuit 900, according to embodiments of the disclosure. As shown in FIG. 9, a dual sided mirror 905 reflects an emitted sensing beam 910 from a sensing beam generator 915 onto a position sensitive device 920. As described herein, in some embodiments position sensitive device 920 can use a variation of a ratio of resistances, and/or related currents, to detect a position of a reflected sensing beam 925. In some embodiments, an accuracy of position sensitive device 920 can be improved by controlling a power level of sensing beam generator 915 to be substantially constant.

More specifically, in some embodiments power control circuit 900 can include an operational amplifier 930 that receives an input signal 935 from position sensitive device 920. In one embodiment, input signal 935 can include a summation of currents passing through position sensitive device 920, for example first and second currents for position sensitive device 250 in FIG. 2 such that a sum of all currents is used as input signal 935. Operational amplifier 930 compares input signal 935 (e.g., a sum of the currents flowing through position sensitive device 250) to a reference current Iref 940 and if the input signal falls below the reference current, the operational amplifier generates an output signal 945 that causes sensing beam generator 915 to increase power. Similarly, if input signal 935 goes above reference current Iref 940 then operational amplifier 930 generates an output signal 945 that causes sensing beam generator 915 to decrease power. In this way sensing beam generator 915 can generate sensing beam 910 with substantially constant power, improving accuracy of position sensitive device 920. In various embodiments operational amplifier 930 can include one or more filtering circuits to consistently and accurately control output signal 945. In one embodiment one or more portions of the filtering circuit may be external components, such as capacitor 950.

In some embodiments the position sensitive devices disclosed herein can be used to report a position of a dual sided mirror between 0.01 degrees to 1.0 degrees, while in other embodiments it can be used to report position of dual sided mirror between 0.05 degrees to 0.5 degrees and in one embodiment it can be used to report the accuracy to within 0.1 degrees.

The MEMS package configurations described above in FIGS. 1-9 are not limited to use with LiDAR-based systems. A person of skill in the art will appreciate that a MEMS package including a dual sided mirror may be useful in any application that uses a mirror to steer light such as, but not limited to, a LiDAR receiver, the head light of a vehicle that turns in coordination with the vehicular steering system, optical diagnostic equipment such as an endoscope, and other applications. A person of skill in the art will further appreciate that a mirror can be fabricated in any shape including round, square, rectangular, triangular, octagonal or any other geometry.

Example LiDAR System Implementing Aspects of Embodiments Herein

Figure 10:
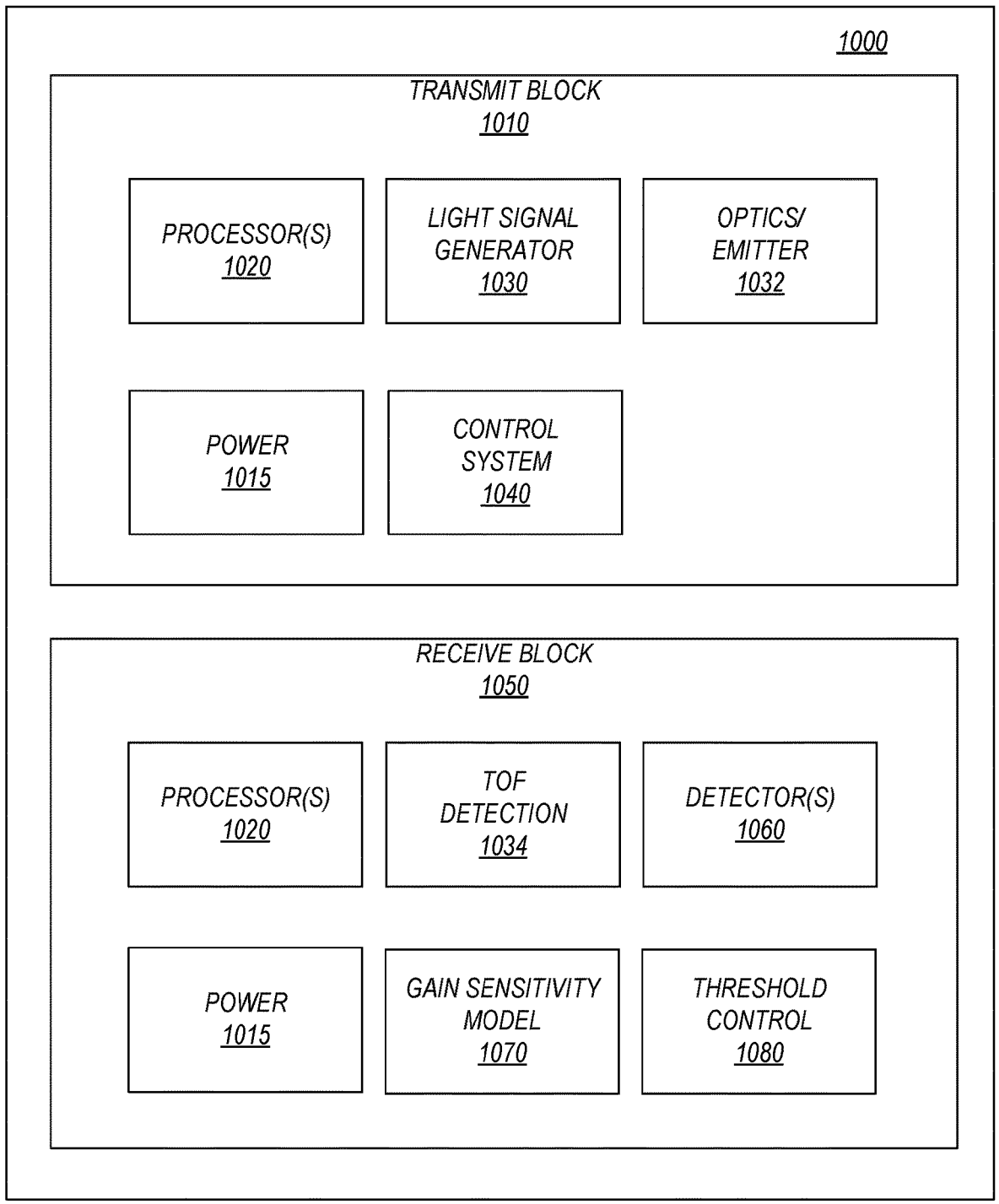
FIG. 10 illustrates a simplified block diagram showing aspects of a LiDAR-based detection system, according to certain embodiments of the invention.

FIG. 10 illustrates a simplified block diagram showing aspects of a LiDAR-based detection system 1000, according to certain embodiments. System 1000 may be configured to transmit, detect, and process LiDAR signals to perform object detection as described above with regard to LiDAR system 100 described in FIG. 1. In general, a LiDAR system 1000 includes one or more transmitters (e.g., transmit block 1010) and one or more receivers (e.g., receive block 1050). LiDAR system 1000 may further include additional systems that are not shown or described to prevent obfuscation of the novel features described herein.

Transmit block 1010, as described above, can incorporate a number of systems that facilitate that generation and emission of a light signal, including dispersion patterns (e.g., 360 degree planar detection), pulse shaping and frequency control, TOF measurements, and any other control systems to enable the LiDAR system to emit pulses in the manner described above. In the simplified representation of FIG. 10, transmit block 1010 can include processor(s) 1020, light signal generator 1030, optics/emitter module 1032, power block 1015 and control system 1040. Some of all of system blocks 1020-1040 can be in electrical communication with processor(s) 1020.

In certain embodiments, processor(s) 1020 may include one or more microprocessors (μCs) and can be configured to control the operation of system 1000. Alternatively or additionally, processor 1020 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 1000. For example, control system block 1040 may include a local processor to certain control parameters (e.g., operation of the emitter). Processor(s) 1020 may control some or all aspects of transmit block 1010 (e.g., optics/emitter 1032, control system 1040, dual sided mirror 220 position as shown in FIG. 1, position sensitive device 250, etc.), receive block 1050 (e.g., processor(s) 1020) or any aspects of LiDAR system 1000. In some embodiments, multiple processors may enable increased performance characteristics in system 1000 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 1030 may include circuitry (e.g., a laser diode) configured to generate a light signal, which can be used as the LiDAR send signal, according to certain embodiments. In some cases, light signal generator 1030 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 1032 (also referred to as transmitter 1032) may include one or more arrays of mirrors (including but not limited to dual sided mirror 220 as described above in FIGS. 1-6) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 1032 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 1015 can be configured to generate power for transmit block 1010, receive block 1050, as well as manage power distribution, charging, power efficiency, and the like. In some embodiments, power management block 1015 can include a battery (not shown), and a power grid within system 1000 to provide power to each subsystem (e.g., control system 1040, etc.). The functions provided by power management block 1015 may be subsumed by other elements within transmit block 1010, or may provide power to any system in LiDAR system 1000. Alternatively, some embodiments may not include a dedicated power block and power may be supplied by a number of individual sources that may be independent of one another.

Control system 1040 may control aspects of light signal generation (e.g., pulse shaping), optics/emitter control, TOF timing, or any other function described herein. In some cases, aspects of control system 1040 may be subsumed by processor(s) 1020, light signal generator 1030, or any block within transmit block 1010, or LiDAR system 1000 in general.

Receive block 1050 may include circuitry configured to detect a process a return light pulse to determine a distance of an object, and in some cases determine the dimensions of the object, the velocity and/or acceleration of the object, and the like. Processor(s) 1065 may be configured to perform operations such as processing received return pulses from detectors(s) 1060, controlling the operation of TOF module 1034, controlling threshold control module 1080, or any other aspect of the functions of receive block 1050 or LiDAR system 1000 in general.

TOF module 1034 may include a counter for measuring the time-of-flight of a round trip for a send and return signal. In some cases, TOF module 1034 may be subsumed by other modules in LiDAR system 1000, such as control system 1040, optics/emitter 1032, or other entity. TOF modules 1034 may implement return "windows" that limit a time that LiDAR system 1000 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 1034 may operate independently or may be controlled by other system block, such as processor(s) 1020, as described above. In some embodiments, transmit block may also include a TOF detection module. One of ordinary skill in the art with the benefit of this disclosure would appreciate the many modification, variations, and alternative ways of implementing the TOF detection block in system 1000.

Detector(s) 1060 may detect incoming return signals that have reflected off of one or more objects. In some cases, LiDAR system 1000 may employ spectral filtering based on wavelength, polarization, and/or range to help reduce interference, filter unwanted frequencies, or other deleterious signals that may be detected. Typically, detector(s) 1060 can detect an intensity of light and records data about the return signal (e.g., via coherent detection, photon counting, analog signal detection, or the like). Detector (s) 1060 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 1070 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 1070 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 1080 may set an object detection threshold for LiDAR system 1000. For example, threshold control block 1080 may set an object detection threshold over a certain a full range of detection for LiDAR system 1000. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 1000, as would be understood by one of ordinary skill in the art. For example, system 1000 may include a bus system (e.g., CAMBUS) to transfer power and/or data to and from the different systems therein. In some embodiments, system 1000 may include a storage subsystem (not shown). A storage subsystem can store one or more software programs to be executed by processors (e.g., in processor(s) 1020). It should be understood that "software" can refer to sequences of instructions that, when executed by processing unit(s) (e.g., processors, processing devices, etc.), cause system 1000 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 1000 may include aspects of gain sensitivity model 1070, threshold control 1080, control system 1040, TOF module 1034, or any other aspect of LiDAR system 1000.

It should be appreciated that system 1000 is meant to be illustrative and that many variations and modifications are possible, as would be appreciated by one of ordinary skill in the art. System 1000 can include other functions or capabilities that are not specifically described here. For example, LiDAR system 1000 may include a communications block (not shown) configured to enable communication between LiDAR system 1000 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 1000 is described with reference to particular blocks (e.g., threshold control block 1080), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 1000 may be combined with or operated by other sub-systems as informed by design. For example, power management block 1015 and/or threshold control block 1080 may be integrated with processor(s) 1020 instead of functioning as separate entities.

Example Computer Systems Implementing Aspects of Embodiments Herein

Figure 11:
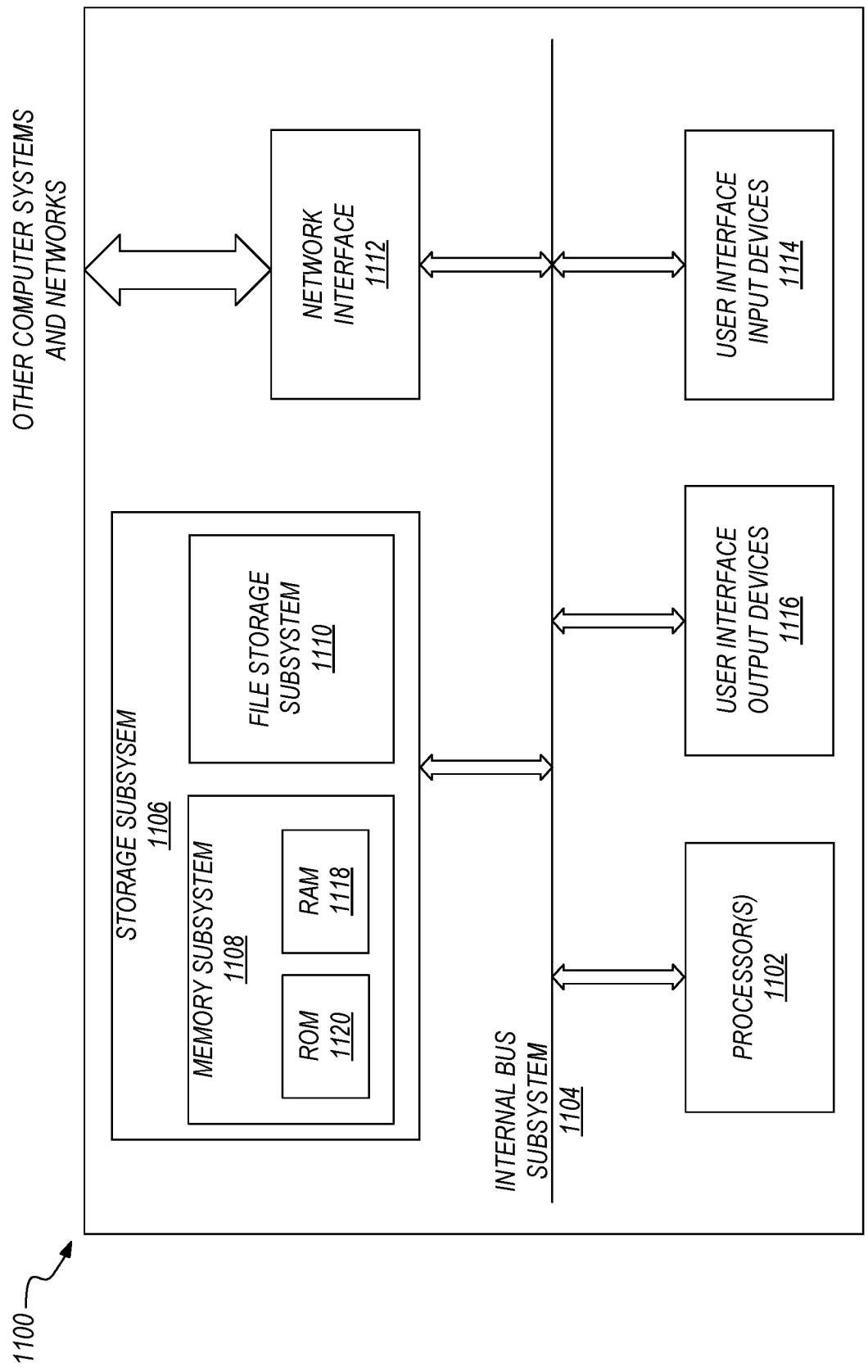
FIG. 11 illustrates an example computer system that may be utilized to implement techniques disclosed herein, according to certain embodiments of the invention.

FIG. 11 is a simplified block diagram of computer system 1100 configured to operate aspects of a LiDAR-based detection system, according to certain embodiments. Computer system 1100 can be used to implement any of the systems and modules discussed above with respect to FIGS. 1-6. For example, computer system 1100 may operate aspects of threshold control 1080, TOF module 1034, processor(s) 1020, control system 1040, or any other element of LiDAR system 1000 or other system described herein. Computer system 1100 can include one or more processors 1102 that can communicate with a number of peripheral devices (e.g., input devices) via a bus subsystem 1104. These peripheral devices can include storage subsystem 1106 (comprising memory subsystem 1108 and file storage subsystem 1110), user interface input devices 1114, user interface output devices 1116, and a network interface subsystem 1112.

In some examples, internal bus subsystem 1104 (e.g., CAMBUS) can provide a mechanism for letting the various components and subsystems of computer system 1100 communicate with each other as intended. Although internal bus subsystem 1104 is shown schematically as a single bus, alternative embodiments of the bus subsystem can utilize multiple buses. Additionally, network interface subsystem 1112 can serve as an interface for communicating data between computer system 1100 and other computer systems or networks. Embodiments of network interface subsystem 1112 can include wired interfaces (e.g., Ethernet, CAN, RS232, RS485, etc.) or wireless interfaces (e.g., ZigBee, Wi-Fi, cellular, etc.).

In some cases, user interface input devices 1114 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1100. Additionally, user interface output devices 1116 can include a display subsystem, a printer, or non-visual displays such as audio output devices, etc. The display subsystem can be any known type of display device. In general, use of the term "output device" is intended to include all possible types of devices and mechanisms for outputting information from computer system 1100.

Storage subsystem 1106 can include memory subsystem 1108 and file/disk storage subsystem 1110. Subsystems 1108 and 1110 represent non-transitory computer-readable storage media that can store program code and/or data that provide the functionality of embodiments of the present disclosure. In some embodiments, memory subsystem 1108 can include a number of memories including main random access memory (RAM) 1118 for storage of instructions and data during program execution and read-only memory (ROM) 1120 in which fixed instructions may be stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and not intended to limit embodiments of the present disclosure. Many other configurations having more or fewer components than system 1100 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An electro-mechanical component comprising:
a MEMS device including a manipulable mirror having a first reflective surface positioned opposite and spaced apart from a second reflective surface;
a transparent window positioned adjacent a top surface of the MEMS device;
a package base positioned adjacent a bottom surface of the MEMS device;
a laser source coupled to the package base;
a position sensitive device positioned adjacent the second reflective surface and coupled to the package base; and
a package base that is attached to the MEMS device with a first hermetic seal,
wherein the transparent window is attached to the MEMS device with a second hermetic seal.

2. The component of claim 1 wherein the laser source is positioned to direct a sensing beam onto the second reflective surface.

3. The component of claim 1 wherein the position sensitive device is positioned to receive a reflected sensing beam reflected from the second reflective surface.

4. The component of claim 1 further comprising a substrate that receives the MEMS device and is sealed to both the transparent window and to the package base.

5. The component of claim 1 wherein the package base comprises a semiconductor material and the position sensitive device is integrated within the package base.

6. A method of using an electromechanical component comprising:
receiving a first light beam through a window of the component;
steering a reflection of the first light beam through the window by reflecting the first light beam off a first surface of a mirror positioned within the component;
generating a second light beam using a laser source positioned external to the component;
directing the second light beam through a second window towards a second surface of the mirror;
steering a reflection of the second light beam using the second surface of the mirror, wherein the second surface of the mirror is opposite and adjacent the first surface of the mirror; and
receiving the reflection of the second light beam with a position sensitive device positioned external to the component,
wherein the window, the mirror, and second window are integrated into a hermetically sealed silicon-based package.

7. The method of claim 6 further comprising regulating a power of the second light beam using a power control circuit that receives an input signal from the position sensitive device.

8. The method of claim 6 wherein the first light beam is generated by a LiDAR beam generator.

* * * * *